United States Patent
Pfeiffer

[15] 3,645,015
[45] Feb. 29, 1972

[54] MORSE CODE TEACHING DEVICE
[72] Inventor: Dagobert F. Pfeiffer, 120 Hartley St., Hamden, Conn. 06517
[22] Filed: Aug. 10, 1970
[21] Appl. No.: 62,315

[52] U.S. Cl. ....................................................35/14, 35/75
[51] Int. Cl. ..........................................................G09b 1/28
[58] Field of Search ........................................35/14, 31 E, 75

[56] References Cited

UNITED STATES PATENTS

| | | | |
|---|---|---|---|
| 1,974,901 | 9/1934 | Stadler | 35/31 E |
| 2,304,327 | 12/1942 | Anderson | 35/75 X |

FOREIGN PATENTS OR APPLICATIONS

| | | | |
|---|---|---|---|
| 9,704 | 1912 | Great Britain | 35/31 E |

Primary Examiner—Harland Skogquist
Attorney—Delio and Montgomery

[57] ABSTRACT

A device for teaching Morse code comprising four flat members in superposition. These four members comprise a base member imprinted with alphamerics except ETANIM, a first central member slidably mounted on the base member having a series of windows for viewing a selected group of alphamerics from among those imprinted on the base member, a second central member slidably mounted on the first central member having a window positioned at right angles to the series of windows on the first central member, and a top member mounted on the second central member and affixed to the base member. The window of the second central member permits viewing a single indicium from among the selected group of alphamerics viewed through the series of windows in the first central member. The top member has a window for viewing the single indicium observable through the window in the second central member. The top member has imprinted thereon the letters ETANIM, and the positive integers if desired, and has two sets of Morse indicia corresponding to these alphamerics. Means are provided for sliding the first and second central members relative to the top and bottom members. The alphameric indicia on the base member are positioned such that the sum of any Morse indicium selected from each of the two sets of Morse indicia by movement of indicating means associated with the central members will cause display of an alphameric corresponding to the sum in the window of the second central member.

7 Claims, 5 Drawing Figures

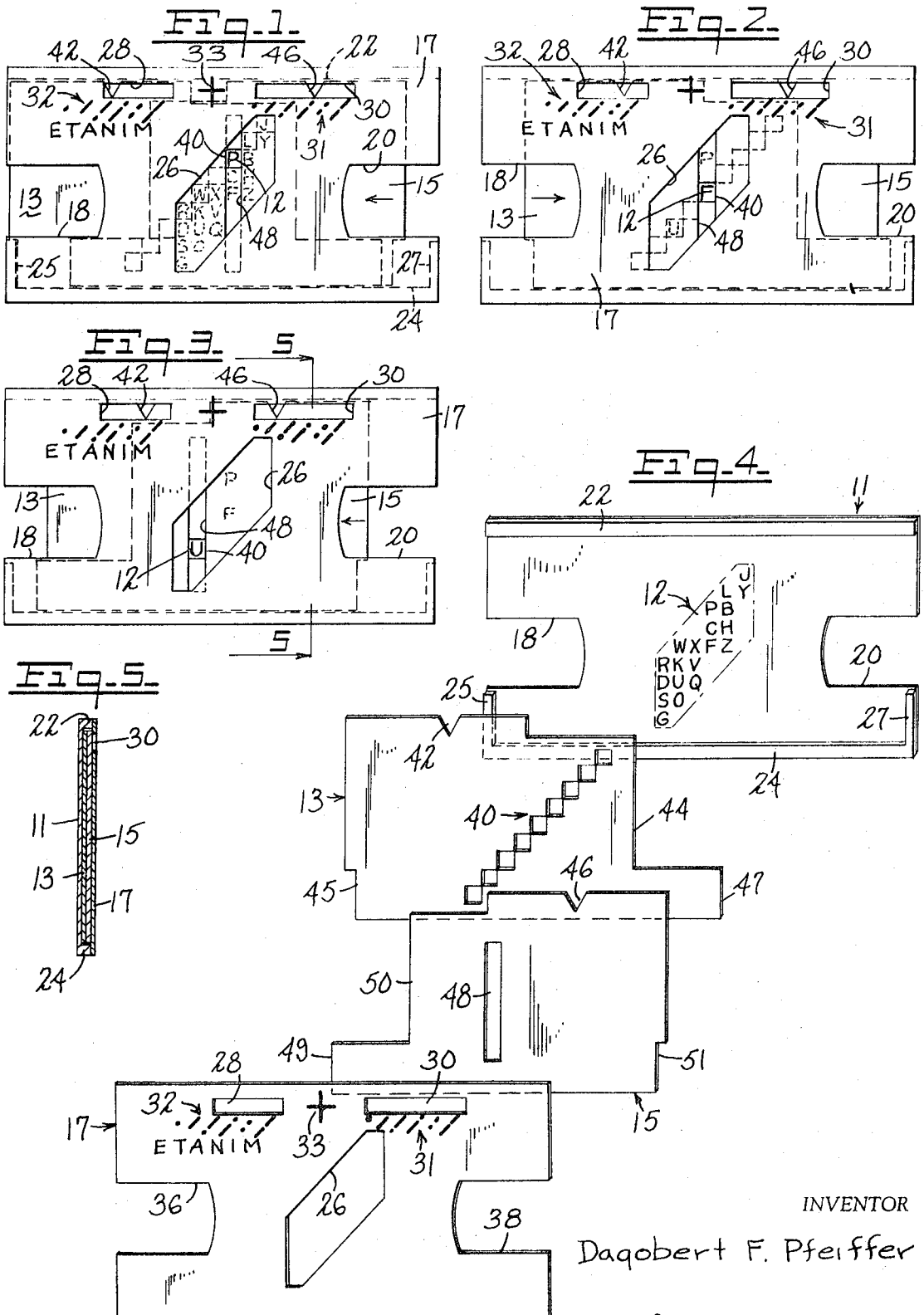

MORSE CODE TEACHING DEVICE

BACKGROUND OF THE INVENTION

This invention relates to a device for teaching Morse code, and more particularly to a device for decoding Morse code signals whether such signals are visual or auditory.

In the teaching of Morse code, particularly the International Morse Code, it is common practice to flash signals to a student who first records the signals by writing them down on paper and then, by reference to a decoding chart, translates the signals into letters, and finally into words. By constant repetition of this procedure, the student gradually memorizes the Morse code and slowly becomes sufficiently skilled to begin direct translation of the signals to letters of the alphabet without first recording the signals.

Decoding devices have been developed to facilitate the educational processes whereby the time spent in memorizing the Morse code is shortened. However, the available devices either are too expensive and cumbersome to carry in the clothing, or they do not provide sufficiently fast decoding. For example, one such device comprises two discs rotatably mounted one on the other, the bottom disc having letters of the alphabet and Morse code dots and dashes imprinted concentrically. The upper disc has two apertures on the perimeter, one aperture framing a letter of the alphabet and the other aperture framing the Morse code translation of the letter. On receipt of a Morse signal, the upper disc is rotated until the proper combination of dots and dashes is located. The letter appearing in the other aperture corresponds to the signals. See U.S. Pat. No. 2,988,822 titled "Semaphore and Morse Code Educational Device", issued to L. J. Knudsen.

A difficulty with the foregoing Morse code training device and similar devices is the necessity of finding the Morse code indicia in the first aperture by trial and error since the devices do not provide means for predetermining the position of the Morse code indicia. The effect of this is a substantial loss of time in the decoding of Morse signals while the operator searches for the Morse indicia on the device.

SUMMARY OF THE INVENTION

Accordingly, an object of the invention is to provide a new and improved device for teaching Morse code, which device permits rapid decoding of Morse signals, in fact while the signals are being received and without reliance upon hit-and-miss searching for Morse code indicia on the device.

Another object is to provide a new and improved Morse code computer which is pocket-size, linear in design, and economical to manufacture.

An additional object is to provide a new and improved Morse code computer of design sufficiently simple for use by youngsters in scouting and similar organizations as well as by radio operators, airline pilots, and armed forces and merchant marine personnel, and the like.

A still further object of the invention is to provide a Morse computer which facilitates the learning of the Morse signals comprising the more difficult three to six signal alphamerics.

Still other objects, features and advantages of the invention will in part be obvious and will in part be apparent from the specification which follows.

In brief outline, the Morse code teaching device or computer of the invention comprises a four-layer laminate structure in which the two inner layers are slidably mounted. The layers comprise a base member, a first and second central members (the slidably mounted layers), and a top member which is affixed to the base member in spaced-apart relationship. The base member is imprinted with a first set of indicia comprising alphamerics except ETANIM. The first central member has a series of windows for viewing a selected plurality of alphamerics from the first set of indicia. The second central member has a window positioned at right angles to the series of windows in the first central member, for viewing a single alphameric from among the selected plurality of alphamerics visible through the series of windows in the first central member. The top member has a window for viewing the single alphameric visible through the window of the second central member, and additionally has at least one other window for viewing indicating means associated with each of the central members. The top member also has imprinted thereon a second set of indicia comprising the letters ETANIM as well as two sets of Morse indicia corresponding to these letters. One of the two sets of Morse indicia optionally may include the Morse indicia for numerals and punctuation, after deletion of the first two components of each of these indicia. The Morse indicia, except for Morse indicia corresponding to ET of one of the sets of alphameric indicia, are positioned adjacent the second window of the top member such that the indicating means observable through the window may be aligned with an indicium from each of the two sets of Morse indicia, except indicia corresponding to ET of one of the sets of alphameric indicia. The first set of alphameric indicia, imprinted on the base member, are positioned such that the sum of any Morse indicium selected from each of the two sets of Morse indicia by movement of the indicating means, will cause display of an alphameric corresponding to the sum in the window of the second central member. Means are also provided for sliding the first and second central members relative to the top and bottom members.

The invention accordingly comprises a device possessing the features, properties, and the relation of elements which will be exemplified in the device hereinafter described, and the scope of the invention will be indicated in the claims.

DETAILED DESCRIPTION

With reference to the drawing,

FIGS. 1–3 are top plan views of a device of the invention;

FIG. 4 is an exploded top perspective view of a device of the invention showing the component members; and FIG. 5 is a vertical section along the line 5—5 of FIG. 3.

Referring first to FIGS. 1–3, a device of the invention is shown as it would appear to the user when decoding Morse signals. The device comprises four component members in sandwich or laminar arrangement, these components being a base member or plate 11 (not shown in FIGS. 1–3), first and second central members 13 and 15, respectively, and a top member or plate 17. Bottom member 11 and top member 17 are established and fixed one to the other in spaced-apart relationship by any suitable means, such as spacers 22 and 24, as best shown in FIGS. 4 and 5. Slidably mounted in the space between members 11 and 17 are first and second central members 13 and 15. Any suitable means may be provided for grasping central members 13 and 15 to slide these members, such as the edges provided by cutouts 18 and 20 in base member 11 and the corresponding cutouts 36 and 38 in top member 17. However, in place of these cutouts, suitable tabs may be provided on central members 13 and 15 as sliding means. The term "alphameric" in the present specification is used in a broad sense to include letters of the alphabet of any language, alone or in combination with the positive integers (numerals) and punctuation marks. Accordingly, although the description of the drawings is in terms of the decoding of Morse signals into the 26 letters of the English alphabet, it is intended that the description be exemplary only, and that by suitable modifications, numbers and punctuation also may be included, in a manner which will be explained.

As best shown in FIG. 4, base member 11 has imprinted thereon a first set of indicia comprising all letters of the alphabet except ETANIM. These 20 letters comprise the eight letters which require three Morse signals and the 12 letters which require four Morse signals, and the letters are arranged such that a selected plurality of the letters are viewable through a series of windows 40 cut into the first central member. The series of windows 40 preferably are arranged in stairway fashion such that four positions of the series of windows are possible for viewing of the selected plurality of letters of the first set of alphabet indicia 12 on base member 11.

The second central member 15 is provided with a window 48 positioned at an angle to the series of windows 40 of the first central member 13. It will be evident that window 48 thereby permits viewing of a single letter in the selected series of letters from alphabet indicia 12 viewable through the series of windows 40. The central members 13 and 15 may be of any shape or thickness effective to permit sliding between base and top members 11 and 17. However, FIG. 4 illustrates preferred configurations of members 13 and 15 which satisfy this purpose. It will be noted therefrom that each of members 13 and 15 are dimensioned to fit within the perimeters provided by spacers 22 and 24 of base member 11, including edges 25 and 27 of spacer 24, but the longitudinal dimensions of central members 13 and 15 are shorter than member 11 and 17, and are sufficient to permit viewing through windows 40 and 48 of all of the first set of alphabet indicia 12.

The sliding, sandwiched relationship of the four layers and spacers is further evident in the section of FIG. 5. It will be noted with reference thereto that just enough clearance is provided between spacers 22 and 24, and central members 13 and 15, to permit sliding movement of the central members.

The sliding fit of members 13 and 15 is limited further by cutouts 45 and 51 which abut spacer ends 27 and 25, respectively, and by rectangular cutout areas 44 and 50 providing edges 47 and 49 for abutment against spacer edges 25 and 27, respectively. Cutouts 44 and 50 also cooperate with cutouts 18, 20, 36 and 38 of the base and top members to avoid grasping of both of central members 13 and 15 in the operation of the device. For example, when it is desired to slide central member 13 by grasping the left hand edge of this member through cutouts 18 and 36, cutout 50 avoids grasping of central member 15 as well. Similarly, when it is desired to slide cutout 15 by grasping an edge of this member through cutouts 20 and 38, by virtue of cutout 44, it is only member 15 which is contacted and not member 13.

Top member 17 is provided with a window 26 which permits viewing of the first set of alphabet indicia 12 in the selected manner provided by windows 40 and 48, as further described below. Top member 17 also is provided with one or more windows or cutouts, illustrated in FIG. 4 as two windows 28 and 30, for viewing of indicating means on central members 13 and 15. As best shown in FIG. 4, suitable indicating means are provided by notches 42 and 46. These notches are made visible through windows 28 and 30, respectively, by virtue of a contrasting background color of base member 11, or of central members 13 and 15.

Below windows 28 and 30 are imprinted two sets of Morse indicia, 31 and 32. The first set 31 of Morse indicia correspond to the letters ETANIM and is positioned relative to window 30 such that indicating notch 46 may be aligned with each of the Morse indicia in the set. It will be noted that these Morse indicia comprise the mono signal Morse indicia for the letters E and T and the two signal Morse indicia corresponding to each of the letters ANIM. Indicating notch 42 is visible through window 28 but is alignable only with the Morse signals of the second set 32 of printing corresponding to the letters ANIM. However, it is convenient also to imprint, as shown in the second set 32, the Morse signals corresponding to the letters E and T for ready reference to these codes. The plus sign indicium 33 is present to emphasize that decoding of three and four signal Morse signals requires addition of components of the total Morse signal as described below. The alphabet indicia 12, the windows 40, 48, 26, 28 and 30, and the indicating notches 42 and 46 are so positioned as to provide the cooperative functions to be described below.

If desired, vertical hairlines may be provided across windows 28 and 30 to assist positioning of indicator notches 42 and 46. Such hairlines may also be imprinted on central members 13 and 15 and thus replace notches 42 and 46 as indicating means.

The component members of the Morse code teaching device of the invention may be manufactured of any suitable material including plastic, cardboard, and the like. The various windows in the component members may simply be cutouts in the members or may be transparent means for viewing the alphabetical indicia. For example, the component members may be manufactured from transparent plastic strips which are then coated to render the surfaces opaque, except for window areas 40, 48, 26, 28 and 30. Accordingly, the term "window" is employed in the present specification in a broad sense and includes not only the physical openings illustrated in the drawing but also any transparent means for viewing the alphameric indicia and indicating means.

Operation of the device may be described with reference to FIGS. 1–3. With reference to FIG. 1, on reception of the Morse signal dot/dash/dash/dot, the operator first slides central member 13 until indicator notch 42 is aligned with the first two of the four Morse signals received, that is, dot/dash. Then, the operator, noting that the remaining Morse signals are dash/dot, moves notch indicator 46 in alignment with these Morse signals imprinted under window 30 on top member 17, by sliding central member 15 to the left until the alignment is achieved. The alphabetical indicium P corresponding to the total Morse signal immediately appears through windows 26 and 48, to the exclusion of all other alphabetical indicia in alphabetical series 12. It should be noted that if the Morse signals are mono signals or two signal flashes, the alphabetical indicia corresponding to these signals are immediately decodable by reason of the imprinting of the corresponding codes ETANIM on the face of the top member 17.

As a second illustration of operation, with reference to FIG. 2, the Morse signal dot/dot/dash/dot is received. To decode this signal, the operator slides central member 13 to the right until indicator notch 42 is aligned with the first two signals, namely, dot/dot. Then the operator slides central member 15, if it is not already so positioned, until indicator notch 46 is aligned with the last two signals of the total Morse signal, namely, dash/dot. Immediately, the corresponding alphabetical indicium F appears through windows 40, 48 and 26.

In still another illustration, demonstrated with reference to FIG. 3, an operator receives the Morse signal dot/dot/dash. If it is not already so positioned, the operator moves central member 13 until indicator notch 42 is aligned with the first two of the signals, namely, dot/dot. He then moves central member 13 to the left until indicator notch 46 is aligned with the last signal received, namely, a dash. The total signal is immediately decoded by the appearance of the alphabetical indicium U in the overlapping series of windows 40, 48 and 26.

Although the foregoing three examples of operation based on FIGS. 1–3 relate to the decoding of International Morse Code signals and translation into letters of the English alphabet, it will be understood that the invention is applicable to the decoding of Morse code signals which include the 10 positive integers (numbers) and punctuation marks, and the translation of the signals into languages other than English. Thus, Morse indicia 31 may be expanded to include the five component indicia for numerals after deleting the first two Morse indicia for each of the numerals. For example, integers 1, 2 and 0 may be indicated by including three dashes in line 31 (the first two Morse indicia for each integer are already present in line 32). Similarly, the six component Morse indicia for punctuation may be included by imprinting in line 31 the four indicia remaining in the Morse signals after subtracting the first two signals (the first two signals are already included in line 32). The 10 integers, of course, will be imprinted with indicia 12 on base member 11.

Representative of a language other than English, into which the Morse signals may be decoded and translated by means of the device, is German. This language requires the addition only of the three umlauts ä, ö and ü and the Ch to line 31, by substraction of the first two Morse signals for each of these letters, and the addition of these four indicia to indicia 12 on base member 11. It will be understood, particularly in conjunction with the explanation of operation below, that only the last two Morse indicia for each of these German letters is required to be carried in line 31 because line 32 already carries the first two Morse indicia for these letters.

For inclusion of numerals, punctuation, and foreign languages, in the decoding capabilities of the device of the invention, these alphamerics and their Morse signals may require larger dimensions in the windows 26 and 30, and corresponding additions to series of windows 40, than are indicated in the drawing. These modifications are easily made, however, and since they will require greater longitudinal dimensions of the device, they are limited and governed only by considerations of the resultant convenience of size and economics of manufacture.

The device of the invention is especially useful for aircraft pilots who employ VOR (Visual Omni Range) navigational equipment since the device provides a convenient and easily operated means for decoding the Morse signals transmitted by radio for identification of VOR positions in flight. In addition, the device enables navigators of ships to conveniently and quickly decode Morse signals emanating from marine beacons. Such signals are usually sent only at infrequent intervals, making instant decoding important.

It will be evident that the Morse computer of the invention is outstanding in its facility for quick and direct decoding of Morse signals, whether such signals comprise one or more individual signals. It should be noted that the illustrated device provides what may be termed a "modular" teaching method since it is based upon a classification of the Morse signals into four groups, corresponding to the letters which translate one, two, three and four signal Morse codes. This step-by-step method embodied in the device of the invention is the key to the rapid decoding and resultant rapid learning technique afforded by the invention. In fact, the device and method has proved so successful that youngsters, such as Boy Scouts, without any previous Morse signaling instruction, begin rapid decoding of Morse signals after about only 5 minutes of instruction in use of the device, and quickly memorize through practice the entire Morse code. Furthermore, the device can be operated so rapidly that the recording of the Morse signals on paper before decoding can quickly be dispensed with so that the student is soon able to decode the signals as they are actually being received.

It will thus be seen that the objects set forth above, among those made apparent from the preceding description, are efficiently attained and, since certain changes may be made in the above device without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for teaching Morse code comprising in sandwiched arrangement:
   a base member carrying a first set of alphameric indicia comprising alphamerics except ETANIM;
   a first central member slidably mounted on said base member, having a series of windows for viewing a selected plurality of alphamerics from said first set of alphameric indicia; and having indicating means fixed thereon;
   a second central member slidably mounted on said first central member, having a window, positioned at an angle to said series of windows, for viewing a single indicium from among said selected plurality of alphamerics, and having indicating means fixed thereon;
   a top member on said second central member and affixed to said base member, said top member having a window for viewing both of said selected plurality of alphamerics and said single indicium, and having at least one other window for viewing said indicating means;
   said top member carrying thereon a first set of Morse indicia corresponding to the letters ANIM and a second set of Morse indicia corresponding to the Morse indicia remaining after substraction of the first two signals of the set of signals corresponding to each alphameric of said first set of alphameric indicia;
   said first and second sets of Morse indicia being positioned relative to said other window such that said indicating means are alignable with an indicium from each of said first and second sets of Morse indicia;
   said first set of alphameric indicia being positioned such that the sum of any Morse indicium selected from said first set of Morse indicia and said second set of Morse indicia by movement of said indicating means, will cause display of an alphameric corresponding to said sum in the window of said second central member.

2. A device as in claim 1 wherein said indicating means comprises the combination of a notch on the perimeter of each of said first and second central members, and a contrasting background on said base member which is viewable through said notch.

3. A device as in claim 1 wherein said series of windows are positioned in stairway relationship on said first central member.

4. A device as in claim 1 wherein said top member carries the letters ANIM, said letters being positioned for correspondence with said first set of Morse code indicia.

5. A device as in claim 4 wherein said top member carries the letters ET and their corresponding Morse code indicia.

6. A device as in claim 1 including means for sliding said first and second central members relative to said top and bottom members.

7. A device as in claim 5 wherein said sliding means comprises exposed edges of said first and second central members.

* * * * *